Aug. 7, 1962 R. K. SAUNDERS ETAL 3,048,772
PROCESS FOR CONDUCTING QUANTITATIVE ANALYSES
Filed May 31, 1955 3 Sheets-Sheet 1
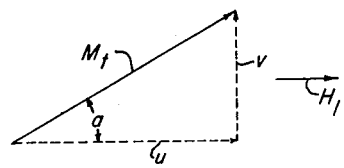
FIG. 1
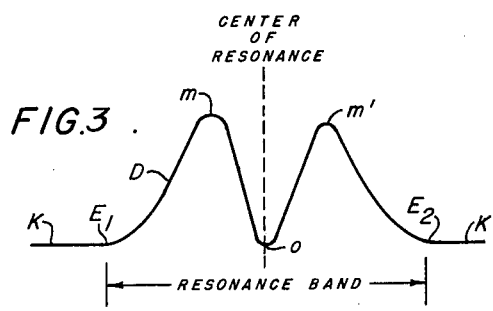
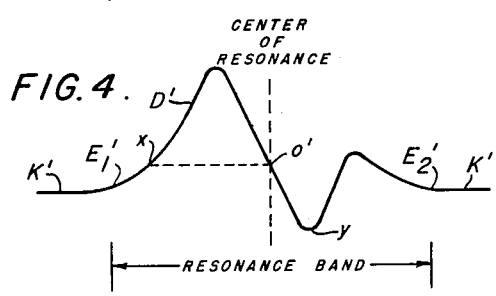
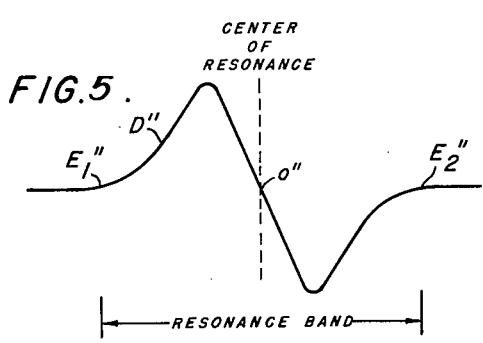
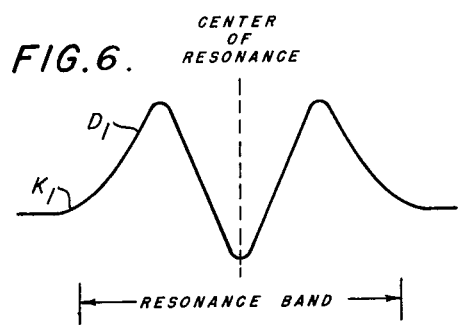
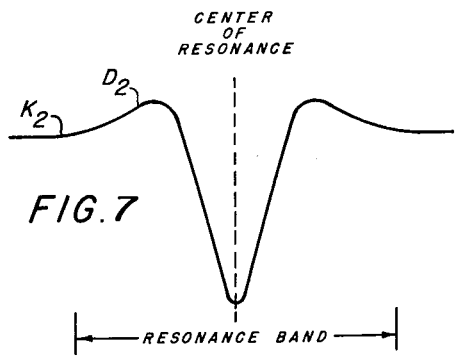
INVENTORS.
Rollie B. Williams,
Rhoderick K. Saunders,
BY Carl G. Ries
ATTORNEY.

United States Patent Office 3,048,772
Patented Aug. 7, 1962

3,048,772
PROCESS FOR CONDUCTING QUANTITATIVE ANALYSES
Rhoderick K. Saunders and Rollie B. Williams, Baytown, Tex., assignors, by mesne assignments, to Esso Research and Engineering Company, Elizabeth, N.J., a corporation of Delaware
Filed May 31, 1955, Ser. No. 512,115
1 Claim. (Cl. 324—.5)

This invention relates to a process for obtaining by nuclear magnetic resonance means a signal which is a direct quantitative measure of the quantity of a nuclear species (i.e., a particular kind of chemical element) contained in a substance, to the utilization of the signal thus obtained and to apparatus useful in obtaining the signal.

In accordance with the present invention a signal which is a direct quantitative measure of the quantity of a nuclear species is obtained by detecting the maximum of intensity of a nuclear magnetic resonance dispersion signal obtained by polarizing a nuclear species contained in a single phase free-flowing liquid comprising a sample in a unidirectional primary magnetic field, by precessing the polarized nuclei with an alternating radio-frequency magnetic field applied at right angles to the primary magnetic field and by scanning the resonance band of the precessing nuclear species while modulating the primary magnetic field in the direction thereof with an audio-frequency alternating magnetic field having an intensity and frequency for the rate of scan employed such as to cause the polarized nuclei to precess in phase with the radio-frequency magnetic field, the period of modulation being less than spin-lattice relaxation time of the nuclear species and the period of scan being greater than spin-lattice relaxation time. A dispersion signal obtained in this manner will be a substantially wholly positive, substantially bilaterally symmetrical nuclear magnetic resonance dispersion signal having a non-repetitive strength value at the center of the resonance band.

The objects and advantages of the present invention will be apparent from the following specification when considered in conjunction with the accompanying drawings wherein:

FIGURE 1 is a vector diagram which is also explanatory of the precession of a nucleus;

FIGURES 3 to 7 are graphic representations of dispersion signals obtainable with the nuclear magnetic resonance spectrometer shown in FIGURE 2;

Throughout the specification and drawings, like reference numerals refer to like parts.

BACKGROUND INFORMATION

Figure 2:
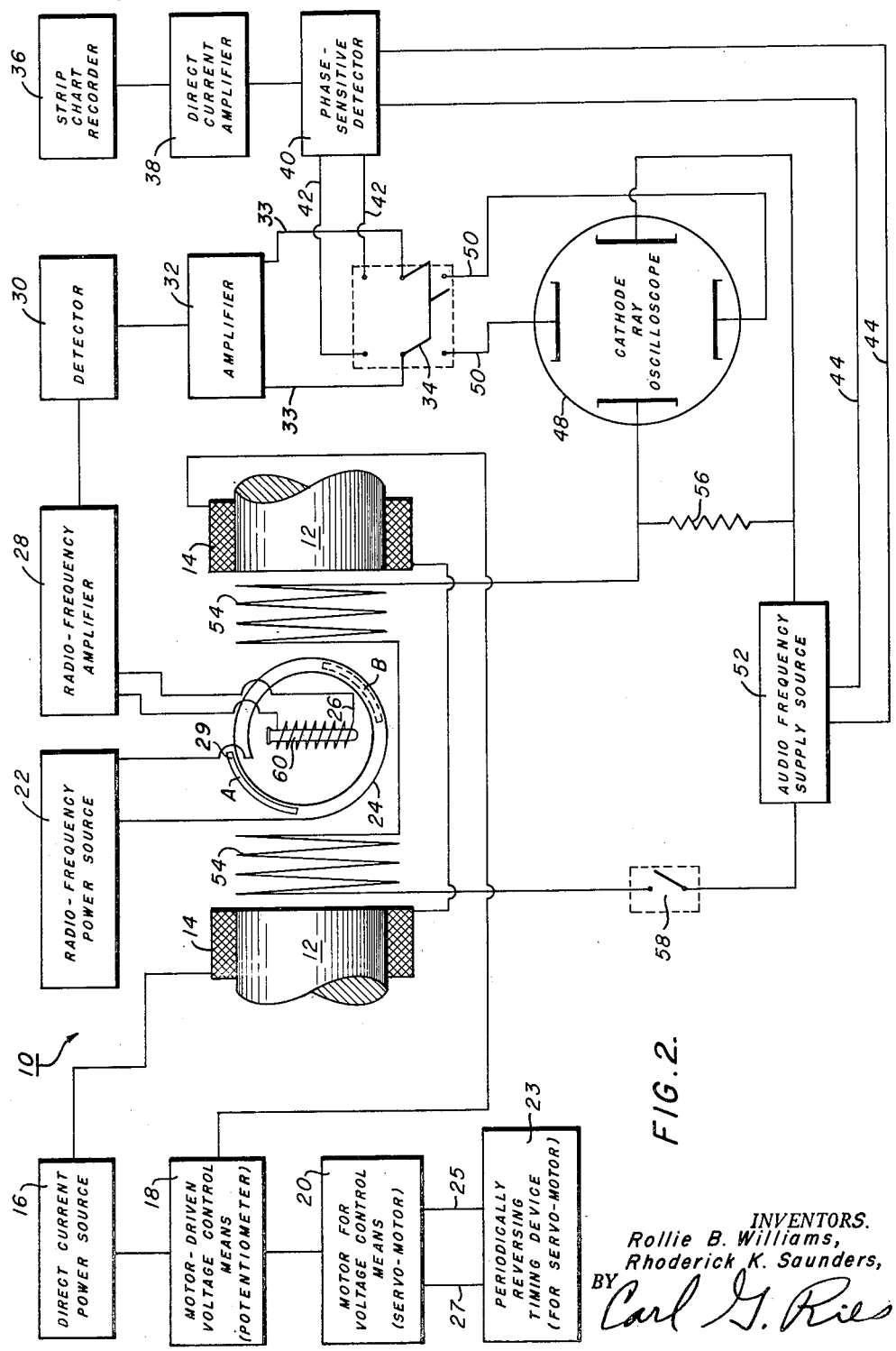
FIGURE 2 is a schematic drawing of a nuclear magnetic resonance spectrometer and of the wiring therefor.

The general subject matter of nuclear magnetic resonance is dealt with in numerous publications, such as the article entitled "Magnetic Resonance," by K. K. Darrow (Bell System Technology Journal, vol. 32, pages 74–99 and 384–405, 1953), the article entitled "Nuclear Magnetism," by Felix Bloch (American Scientist, vol. 43, pages 48–62, January 1955), Patent No. 2,561,489 to Bloch et al. and Patent No. 2,561,490 to Varian.

Briefly, and by way of summary, it may be pointed out that those nuclear species which contain an odd number of protons, an odd number of neutrons or an odd number of both will generally have magnetic moments and spin angular momenta.

If a substance containing such a nuclear species is placed in a strong magnetic field it will be found that the spin axes of the nuclei will be brought into alignment in the magnetic field so that such axes are polarized with respect to the field. As a consequence of the quantum nature of angular momentum, the spin axes of the nuclei can assume only a limited number of stable orientations with respect to each other and with respect to the magnetic field. It turns out that the number of possible orientations is $2I+1$.

The potential energy of a magnetic dipole in a magnetic field depends upon its orientation with respect to the field and it follows, therefore, that there are $2I+1$ different possible energy levels of a nucleus in a magnetic field.

It is possible to cause a nucleus aligned in a magnetic field to change from a lower energy level to the next higher energy level through the absorption of radiation (i.e., through nuclear magnetic resonance absorption). This happens when radiation from an external source is utilized, the frequency of such radiation in cycles per second ($\gamma$) times Planck's constant ($h$) being equal to the energy separation (E) between energy levels (i.e., $h\gamma = E$). This condition is commonly referred to as a condition of "resonance." The radiation energy is commonly supplied by means of an alternating magnetic field in the radio-frequency range, which radio-frequency field is applied at right angles to the strong magnetic field in which the nuclei are placed. The applied radiation energy causes the aligned nuclei to precess about their axes in the manner of a gyroscope at a frequency of precession substantially equal to the frequency of the radio-frequency field.

In an ideal situation there would be only one resonance frequency for a given nuclear species at a given field strength since the energy separation between any two adjacent energy levels of the same nuclear species is the same in this situation.

Actually there is a band of frequencies rather than a single frequency. The main reason for this is that the field at a given nucleus is a superposition of the external field plus the magnetic fields produced by the magnetic dipole moments of the nearest neighboring nuclei. The process of changing the magnitude of the primary magnetic field, the frequency of the radio-frequency field, or both, in order to traverse the resonance band of a nuclear species is commonly referred to as the process of "scanning the resonance band" and the rate of change is commonly referred to as the "rate of scan." When one or both of the variables is increased in strength from an initially low value to traverse the resonance band, the operation is commonly referred to as a "forward" scanning operation and when one or both such variables is decreased from an initially high value to traverse the resonance band the process is normally referred to as a "reverse" scanning operation.

As indicated, the members of a nuclear species will precess during resonance. If at a given instant of time the applied radio-frequency magnetic field is suddenly removed, the nuclei will continue to precess freely for a subsequent period of time. However, since each nucleus will be in a slightly different magnetic field (produced by the interaction of the primary magnetic field with the magnetic fields of neighboring nuclei), the "free" precession frequency of each nucleus will become slightly different. After a sufficient period of time has elapsed the various precessing nuclei will be completely out of phase. A measure of the time required for this to happen is referred to as the spin-spin relaxation time (since it is dependent on the interaction of adjacent nuclear spins) and is usually referred to by the symbol $T_2$. $T_2$ is normally measured in terms of the inverse band width of a resonance band expressed in terms of frequency.

When a nuclear species is caused to precess, other effects also occur which affect the amount of energy that is absorbed. Thus, the radio-frequency radiation field at the resonant frequency induces transitions from a higher to a next lower energy state. The relative number of nuclei in the lower state increases as the temperature is decreased and therefore the resonance absorption tends to increase as the temperature is decreased. When there is an absorption of radiation, the rate of transition of nuclei from lower to higher states is greater than that from higher to lower because of the excess number in the lower states. If this process were to continue unabated a situation would arise in which the various states would become equally populated so that no net absorption of energy would occur. Such a condition never actually occurs because there is another mechanism by which nuclei in the upper energy levels may lose energy and thereby establish equilibrium. This comes about through the interaction of the excited nuclei with the surrounding lattice composed of molecules and other atoms whereby energy is given up to this lattice. The exchange of energy takes place through interaction of the magnetic dipole moments of the nuclei and the fields of the other molecules and atoms. This phenomenon is commonly referred to as the spin-lattice relaxation time and is usually referred to by the symbol $T_1$. Spin-lattice relaxation time ($T_1$) is measured as the time required for the exchange of energy between spin and lattice to take place.

The foregoing is an over-simplification since the net amount of energy that will be absorbed by a resonating (i.e., precessing) nuclear species is dependent upon a multiplicity of factors, some of which are known or determinable and some of which are unknown or undeterminable. Thus, the strength of the magnetic field, the temperature of the sample, the relative abundance of the nuclear species in the sample, the environmental interrelationship of the various nuclei to each other, etc. will all have an effect upon the net amount of energy that is absorbed.

With reference to FIG. 1, the vectorial summation ($M_t$) of components of the resonant moments perpendicular to the primary magnetic field in the plane of $H_1$ will normally bear a phase relationship to the applied radio-frequency magnetic field $H_1$.

Such a phase relationship at one instant of time is vectorially shown in FIGURE 1 wherein the magnitude of $M_t$ and the phase relationship thereof with respect to $H_1$ is indicated by the angle "$a$." It will also be seen from FIGURE 1 that $M_t$ is actually the vectorial sum of a component "$v$" and a component "$u$." When the nuclear species precesses in phase with the radio-frequency field $H_1$ there will not be a "$v$" component. The "$v$" component is commonly referred to as the absorption component and the "$u$" component is commonly referred to as the dispersion component. It will be apparent that measurement of the intensity of either the absorption or dispersion component will give a measure of the extent to which energy has been absorbed due to precession of members of a nuclear species. It will also be apparent that the absorption component "$v$" will be in phase quadrature with the applied radio-frequency field and that the dispersion component "$u$" will be in phase therewith. As a general rule, the angle "$a$" will constantly change as the resonance band is scanned. As a consequence, the absorption component "$v$" and the dispersion component "$u$" will change in intensity during the scanning operation.

A measure of the amount of energy absorbed by a precessing nuclear species during scanning operations may be obtained by detecting the intensity of either the absorption component "$v$" or the dispersion component "$u$."

INSTRUMENTATION

Nuclear magnetic resonance spectrometers have been constructed which are capable of measuring either the "$v$" (absorption) component, the "$u$" (dispersion) component, or both, such spectrometers being of the balanced bridge type, the oscillating detector type, the induction type, etc. In essence, such spectrometers comprise the same basic elements including (1) a transmitter for producing a source of radio-frequency power, (2) an inductance coil to receive the output power from the transmitter, which coil is positioned about a sample to be investigated, (3) a receiver for accepting the resonance (e.g., scanning) signal produced at the sample location through some type of coupling arrangement, (4) a large magnet, in the field of which the sample and coil arrangements are situated, and (5) suitable means for registering the nuclear magnetic resonance signal.

The construction of an inductance type of nuclear magnetic resonance type spectrometer is schematically shown in FIGURE 2. In accordance with this construction there is provided an electromagnet, designated generally by the number 10, comprising cores 12—12 and coils 14—14, the coils 14—14 being connected in series with a suitable direct current supply source 16 which provides the current to be used in generating the primary magnetic field. For many purposes it is desirable to provide suitable means for periodically varying the strength of the current flowing through the coils 14—14, such means comprising, for example, a suitable voltage control means 18 such as a potentiometer of the so-called "Helipot" type which is provided with a servo-motor 20 for periodically reversing the direction of voltage change in response to a signal derived from a timing mechanism 23, a "forward" (voltage-increasing) signal being transmitted from the timing device 23 to the servo-motor 20 through electrical connection 25 and a "reverse" (voltage-decreasing) signal being transmitted through electrical connection 27. A radio-frequency power source 22 is provided for transmitting a radio-frequency signal through a transmission coil 24. An inductance coil 26 is also provided.

Suitable means are also provided to regulate the leakage flux that is developed during operations in order to prevent a coupling between transmission coil 24 and the inductance coil 26. Such means may comprise a rotatable, semi-circular paddle 29 formed of an electro-conductive material such as copper (see Bloch et al. Patent No. 2,561,489). Generally, additional paddles (not shown) similar to the paddle 29 are utilized to provide for a finer adjustment, such additional paddles being concentrically connected with the paddle 29 for rotation therewith and preferably being formed of a material less electro-conductive than copper, such as graphite. The paddle 29 may be positioned (e.g., position "A") by any suitable means (not shown) to induce a current in the inductance coil 26 in phase with the radio-frequency field or the paddle 29 may be rotated to a second position (e.g., position "B" which is shown by dotted lines) to induce a current in the coil 26 which is in phase quadrature with the radio-frequency field.

The inductance coil 26 is connected with a suitable radio-frequency amplifier 28, the amplifier 28 being connected with a detector 30 which, in turn, is connected with an amplifier 32. The amplifier 32 may be of any suitable construction comprising, for example, a so-called "audio-amplifier" which amplifies only those components of the current transmitted by the detector 30 which have a frequency of about 10 cycles per second or more or, as another example, a so-called "direct current amplifier" which amplifies the components having a frequency of less than 10 cycles per second in addition to the components having a frequency of more than 10 cycles per second. The amplifier 32 is connected with suitable current detecting means such as a strip chart recorder 36 or a cathode ray oscilloscope 48. This may be accomplished, for example, by connecting the audio-amplifier 32 with a double-pole switch 34 through leads 33—33, the switch 34 having a first set of leads 42—42 connected with a strip-chart recording device and a second set of leads 50—50 connected with a cathode ray oscilloscope 48.

If a strip-chart recorder 36 is used, a direct current amplifier is preferably provided as the amplifier 32 and the recorder 36 is connected with the direct current amplifier 38 which, in turn, is connected with a phase-sensitive detector 40. The phase-sensitive detector 40 is connected with the switch 34 through the leads 42—42 and is also connected with a suitable audio-frequency reference voltage supply source 52 to be described subsequently.

Another type of detecting apparatus which may be used comprises a cathode ray oscilloscope 48 having the vertical plates thereof connected with the leads 50—50 of the double pole switch 34. When an oscilloscope 48 is employed, the ampifier 32 may be either an audio-amplifier or a direct current amplifier, an audio-amplifier being preferred generally. The horizontal plates of the oscilloscope 48 are connected with a suitable alternating current supply source 52 by means of a circuit comprising coils 54—54 and a bridging resistor 56. The coils 54—54 are positioned between the cores 12—12 of the electro magnet 10 to provide a means for modulating the primary magnetic field generated between the cores 12—12. There is also provided a suitable switch 58 for cutting out the coils 54—54 when desired.

As a general rule, the absorption component "$v$" of a nuclear species is most conveniently detected by means of the cathode-ray oscilloscope 48 whereas the dispersion component "$u$" is most conveniently detected by means of the strip chart recorder 36. However, either detector may be used.

There is also provided a sample holder 60 of any suitable construction which is positioned within the inductance coil 26. The sample holder 60 is adapted to contain a material comprising a single phase, free-flowing liquid containing a nuclear species whose resonance band is to be scanned by nuclear magnetic resonance spectroscopic means.

Structurally, the axis of the radio-frequency transmitter 24 is positioned at right angles to the axis of the cores 12—12 and the axis of the inductance coil 26 is positioned at right angles to the axis of the radio-frequency transmitter 24 and the axes of the cores 12—12.

The manner of operation of the nuclear magnetic resonance spectrometer may be varied widely. As one example, and when the primary magnetic field generated between the cores 12—12 is to be modulated, the switch 58 is closed and the double pole switch 34 is connected with the terminals 50—50. The motor drive 20 for the potentiometer 18 is rendered inoperative so that a direct current of constant voltage will flow through the coils 14—14 to thereby generate a primary magnetic field of known substantially constant strength between the cores 12—12. The flux paddle 29 is positioned at position A when a dispersion signal is to be obtained or at position B when an absorption signal is to be obtained. A sample containing a nuclear species to be detected is placed in the sample holder 60 and a radio-frequency signal of the proper frequency is transmitted through the coil 24. At the same time an audio-frequency alternating current from the alternating current supply source 52 is caused to flow through the coils 54—54 (e.g., a 60 cycle current). The magnetic flux generated by the coils 54—54 will sweep (i.e., modulate) the primary magnetic field generated by the cores 12—12 and thereby simultaneously horizontally deflect the beam of the cathode ray oscilloscope 48. A current will be induced in the coil 26, which current will be amplified by the radio-frequency amplifier 28, detected by the detector 30, and still further amplified by the amplifier 32 whereby the vertical deflection of the beam of the cathode ray oscilloscope 48 is controlled. As a result, an absorption or dispersion signal will be traced on the face of the oscilloscope 48.

As another example, the double pole switch 34 is connected with the terminals 42—42 leading to the phase sensitive detector 40 and the motor drive 20 for the potentiometer 18 is rendered operative to slowly periodically vary the voltage of the current flowing through the coils 14—14. The electrical current induced in the coil 26 is amplified in the described manner. The audio amplifier 32 is connected to the phase sensitive detector 40 which is also connected with the audio-frequency voltage supply source 52 to provide a reference voltage, and the phase sensitive detector is connected with the strip chart recorder 36 which records the signal transmitted thereto.

It will be apparent that the switch 58 may be closed and the motor drive 20 for the potentiometer 18 rendered operative in order to vary the strength of the primary magnetic field generated between the cores 12—12 from an initial value while simultaneously modulating the same with the audio-frequency magnetic field generated by the coils 54—54. In this situation the strip chart recorder 36 is preferably employed as the detecting means.

The absorption curves and the dispersion curves that are obtained by the foregoing methods will have specifically different characteristics, and, moreover, the characteristics of such curves will be dependent upon the specific operating conditions employed. As a result, specifically different absorption and dispersion curves are obtained when the operating conditions are varied. Among the operating conditions that will be significant in determining the characteristics of such curves are the strength of the primary magnetic field, the strength of the applied radio-frequency alternating magnetic field, the rate at which the primary magnetic field, the radio-frequency field or both (as the case may be) are changed to scan the resonance band of a nuclear species, and, when employed, the frequency and intensity of the modulating alternating magnetic field.

DISCUSSION OF FACTORS AFFECTING A QUANTITATIVE DETERMINATION OF A NUCLEAR SPECIES

The present invention is directed to a process for obtaining by nuclear magnetic resonance spectroscopic means a signal which is a direct measure of the quantity of a nuclear species contained in a single phase free-flowing liquid comprising a sample and to the utilization of such a signal.

In general, in accordance with the present invention, a direct quantitative measure of the quantity of a nuclear species contained in a single phase free flowing liquid comprising a sample is obtained by detecting the first maximum of strength of a substantially wholly positive nuclear magnetic resonance dispersion signal having a non-repetitive strength value at the center of the resonance band of the nuclear species.

The desired signal is obtained by polarizing the nuclear species to be determined and precessing such polarized nuclear species in phase with radio-frequency alternating magnetic field of precession while modulating the primary magnetic field in the direction thereof with an audio-frequency alternating magnetic field having a period of modulation which is less than the spin-lattice relaxation time of the nuclear species, the scan period being greater than spin-lattice relaxation time. As indicated, there is obtained, under such circumstances, a bilaterally symmetrical dispersion signal having a non-repetitive strength value at the center of the resonance band of the nuclear species.

A wide variety of operating conditions may be utilized in obtaining dispersion signals having the above described characteristics. This may be graphically illustrated by considering representative types of dispersion signals that are obtainable in accordance with the present invention when scanning the resonance band for the hydrogen contained in a sample consisting, for example, of 85 weight percent of glycerin and 15 weight percent of water.

Thus, if the hydrogen nuclei are polarized in a primary magnetic field having an average strength of about 10,000 gausses, which primary magnetic field is varied in strength to forwardly scan the hydrogen resonance band while being modulated in the direction therof with a 60 cycle audio-frequency magnetic field having an intensity of about 0.2 gauss, and if a radio-frequency magnetic field having a frequency of about 42.6 megacycles per second and a strength of about 0.3 gauss is applied at right angles to the primary magnetic field, the hydrogen nuclei will be polarized and precessed in phase with the radio-frequency field. If the resonance band for the hydrogen nuclei is scanned over about a 50 second interval by progressively increasing the strength of the primary magnetic field from an initially low value (e.g., about 9,999 gausses) by about 2 gausses, a dispersion signal D may be obtained by suitable means such as a strip chart recorder, having a configuration similar to that shown in FIGURE 3. The dispersion signal D may be employed in obtaining a direct quantitative measure of the quantity of hydrogen contained in the sample scanned in accordance with the present invention. In this situation and under the recited conditions, the audio-frequency magnetic field will have a period which is less than the spin-lattice relaxation time of the hydrogen contained in the aqueous glycerin solution. The period of scan will be greater than spin-lattice relaxation time.

It will be noted that the dispersion signal D has a comparatively low intensity at the extremeties $E_1$—$E_2$ thereof, with respect to the normally constant value K of the signal outside the resonance band. It will be further noted that the dispersion signal D has a first maximum "$m$" at one side of the center of the resonance band, the intensity of which is detected in accordance with the present invention, a minimum "$o$" at the center of the resonance band and a second maximum "$m'$" at the other side of the center of the resonance band. It will be further noted that the dispersion signal D is bilaterally symmetrical and that the intensity of the same at the minimum "$o$" at the center of the resonance band is substantially equal to the intensity value K outside of the resonance band so that the dispersion signal D has a non-repetitive strength value at the center of the resonance band.

If the resonance band for the hydrogen contained in the sample of FIG. 3 is scanned under the above conditions but at a more rapid rate (e.g., about 1 second) the hydrogen nuclei likewise precess in phase with the applied radio-frequency field but a dispersion signal D' of the type shown in FIGURE 4 will be obtained. In this situation the period of scan is approximately equal to spin-lattice relaxation time. It will be noted that the dispersion signal D' is not bilaterally symmetrical and that the value of the same at the point $o'$ at the center of the resonance band is repeated at the point "$x$" within the resonance band. It will be further noted that the dispersion signal D' has an off-center minimum "$y$" which is of negative intensity as compared with the normally constant intensity value K' outside of the resonance band.

When employing a scan rate of 0.1 c.p.s. and also a field modulated at 500 c.p.s. the scan period will be less than spin-latice relaxation time and a dispersion signal D'' of the type shown in FIGURE 5 will be obtained. It will be noted that the dispersion signal D'' is not bilaterally symmetrical in that the portion $E_1''$–$o''$ thereof is positive in nature and the portion $o''$–$E_2''$ is negative in nature with respect to the normally constant intensity value K outside the resonance band.

Turning again to the operating conditions utilized in obtaining the dispersion signal D of FIGURE 3 wherein a comparatively slow scanning rate of about 50 seconds was employed, a different effect is observable if the frequency of modulation of the primary magnetic field is changed. Thus, if an audio-frequency magnetic field having a lower frequency (e.g., about 1.0 cycle per second) is employed, the period of modulation will be approximately equal to spin-lattice relaxation time and a dispersion signal $D_1$ of the type shown in FIGURE 6 will be obtained. It will be noted that the dispersion signal $D_1$ is bilaterally symmetrical but is of a negative strength value at the center of the resonance band with respect to the normally constant value $K_1$ of the dispersion signal $D_1$ outside the resonance band.

If the frequency of modulation is still further reduced (e.g., to a frequency of about ⅒ cycle per second), the period of modulation will be greater than spin-lattice relaxation time and a dispersion signal $D_2$ of the type shown in FIGURE 7 will be obtained, such signal being of a much more pronounced negative character than the dispersion signal of FIGURE 6.

If the rate of scan and the intensity and frequency of modulation are employed which were utilized in obtaining a dispersion signal of FIGURE 3 but a liquid sample less viscous than that of FIG. 3 is employed (e.g., heptane), it will be found that a dispersion signal of the type shown in FIGURE 4 or 5 will be obtained, for in this situation the spin-lattice relaxation time for the hydrogen nuclei will be increased to a time greater than the scan period. In this situation it is possible to obtain a dispersion signal of the desired characteristics as shown in FIGURE 3 by decreasing the rate of scan.

If the liquid sample is more viscous than that of FIG. 3 (e.g., dodecane) a dispersion signal of the type shown in FIG. 7 will be obtained for the spin-lattice relaxation time will become less than the period (i.e., frequency) of modulation. In this situation, it is possible to provide the operative conditions necessary to give a dispersion signal of the type shown in FIGURE 3 by increasing the frequency of modulation of the primary magnetic field.

A wide variety of operating conditions may be utilized in accordance with the modification of the present invention wherein a dispersion signal of the type shown in FIGURE 3 is obtained.

For best results, the primary magnetic field in which the sample is placed should have an average strength of about 1,000 to 15,000 gausses although a somewhat greater or lesser field strength may be provided if it is so desired. Generally speaking, it is preferable to provide a primary magnetic field having a strength of about 10,000 gausses.

In accordance with this modification, the audio-frequency alternating magnetic field that is utilized in modulating the primary magnetic field should preferably have an amplitude of about 0.2 to 1.0 gauss and, for best results, it is preferable that the amplitude be equal to about half the width of the resonance band to be scanned. The frequency of the modulating current should be in the audio-frequency range and may vary from about 0.5 to 500 cycles per second.

It is necessary that the strength of the magnetic field generated by the radio transmitter be about 0.01 to 10 gausses for accurate results. As has been indicated, the frequency of the radio-frequency field to be used for a given nuclear species is dependent on the average strength of the primary magnetic field.

During operations the actual strength of the primary magnetic field is varied from a value below the average value thereof to a value above the average value in order to scan the resonance band of the nuclear species in the manner described above. Generally speaking, the total variation should be in the order of about 0.5 to 10 gausses. The variation in the strength may be such that the entire resonance band is scanned or may be such that only a portion of the resonance band, up to and including the center of the resonance band, is scanned. The rate of scan may be varied from a fraction of a second to several seconds, depending on the environmental conditions of the nuclear species to be determined and on the operating conditions that are to be employed. If desired, the scanning operation may be accomplished by progressively increasing the strength of the primary magnetic field from an initial value below the average value thereof. This is commonly referred to as a "forward" scanning operation. Conversely, the strength of the primary magnetic field may be decreased from an initial value above the average value thereof; this being commonly referred to as a "reverse" scanning operation. If only a portion of the resonance band is to be scanned, operations may be conducted so that there is a forward scan into and across the center of the resonance band and a reverse scan back across the center of the resonance band and out of the resonance band, or vice-versa.

There is an interrelationship of the rate of scan to the radio-frequency power and the frequency and intensity of modulation of the primary magnetic field. A dispersion signal having the desired characteristics is obtained only when these factors are properly correlated. The interrelationship is of a relative nature and is dependent on the operating conditions employed. However, the proper correlation is arrived at with comparative ease by holding two of the factors constant (e.g., rate of scan and radio-frequency power) and varying the other factors (e.g., the frequency and intensity of modulation) to obtain a dispersion signal having the desired characteristics.

Thus, by way of illustration, the radio-frequency power to be used and the rate of scan to be employed may be predetermined and the resonance band of a nuclear species may then be scanned while modulating the primary magnetic field at a given frequency and intensity of modulation. If the resultant dispersion curve is not bilaterally symmetrical the period of scan is not greater than the spin-lattice relaxation time of the nuclear species. In this situation, the rate of scan may be decreased to provide a symmetrical dispersion signal. If the dispersion curve is not substantially wholly positive in nature the period of modulation is not less than the spin-lattice relaxation time of the nuclear species. In this situation, the frequency of modulation may be decreased until a substantially wholly positive dispersion signal is obtained.

The sample to be tested may consist of a single phase free-flowing liquid containing the nuclear species or may comprise such a liquid in physical admixture with a solid material. Generally speaking, the liquid portion of the sample should have a viscosity of about 0.1 to 10,000 centipoises and the nuclear species to be determined should be a part of such liquid. As a consequence, the spin-lattice relaxation of the nuclear species will be approximately equal to the spin-spin relaxation time thereof. The liquid portion of the sample should be a single phase liquid. That is to say, the components of the liquid should be mutually miscible or soluble, as the case may be, so that separate phases of the liquid sample will not be formed on standing. The liquid portion of the sample should be substantially free from paramagnetic materials (e.g., should not contain more than about 0.02 molar concentration of paramagnetic atoms) for the best results.

Many substances are liquid materials having the requisite viscosity and may be used directly. If the substance is a normally gaseous material which can be liquefied by cooling or pressure application or a normally solid or highly viscous material which can be heated to form a liquid of the requisite viscosity, the sample to be tested may consist of such a material in a flowable liquid condition. However, if the substance to be tested is a solid, gas, or viscous liquid which cannot be directly converted to a liquid of the desired viscosity, it is necessary to prepare a solution of the substance in a suitable solvent whereby a liquid of the requisite viscosity is obtained. As has been indicated, the sample may also comprise a solid material.

If the solvent contains the nuclear species to be determined, this factor must be taken into consideration. Accordingly, it is generally preferable to utilize a solvent which does not contain the nuclear species to be determined. Thus, for example, if the nuclear species $H^1$ is to be quantitatively determined, the solvent should preferably be a composition substantially free from hydrogen such as carbon tetrachloride, carbon disulfide, etc. If a solvent such as benzene, acetone, methyl ethyl ketone, a chlorinated liquid hydrocarbon, an aromatic hydrocarbon, etc. is used, the hydrogen content of the solvent will contribute to the intensity of the dispersion signal and this contribution must be predetermined by prior analysis if an accurate determination is to be obtained.

It is to be noted in passing that it is usually preferable (although not absolutely necessary) to conduct scanning operations after the sample has been at rest for a period of time sufficient to establish steady motion of the molecules comprising the single phase, free-flowing liquid. The time required to establish steady molecular motion may be expressed in terms of the relaxation time factor $T_2$ as a multiple thereof and a period of 5–100 times $T_2$ will normally be sufficient to establish steady molecular motion.

As has been indicated, the intensity of the first maximum of the dispersion signal (maximum "m" of FIG. 3) is detected in accordance with the present invention. When the intensity of a dispersion signal at the first maximum thereof is detected in accordance with the present invention, the relationship between the detected intensity and the concentration of a nuclear species in the sample may be represented by the following formula:

(I) $$h = KVC_1C_2$$

wherein $h$ equals the detected intensity of the dispersion signal at the first maximum, $V$ equals the effective volume of sample exposed to the crossed primary and radio-frequency magnetic fields, $C_1$ equals the weight per unit volume of the substance to be determined; $C_2$ equals the weight percent of the nuclear species in the sample; and $K$ is a constant derived by solving the above formula utilizing the detected intensity at the first maximum of a dispersion signal derived from a reference sample containing a known percentage of the nuclear species ($K$ being the only unknown factor in the latter situation). That is to say:

(II) $$K = \frac{h^*}{V'C_1'C_2'}$$

wherein $V'$, $C_1'$, and $C_2'$ have the meaning given above with respect to $V$, $C_1$ and $C_2$ of Formula I and wherein $h^*$ is the detected first maximum of intensity for the reference sample containing the known percentage of the nuclear species. The samples should be at the same temperature.

If the unknown and reference samples are contained in sample holders of the same dimensions, the factors $V$ and $V'$ may be eliminated from Equations I and II above or, to the same effect, the constant for Equation I may be expressed in terms of $KV$; viz.:

(III) $$KV' = \frac{h^*}{C_1'C_2'}$$

It will be apparent that if the sample to be analyzed consists of a liquid substance containing the nuclear species the factor $C_1$ becomes unity as applied in the above formulae.

EXAMPLES

The following examples of specific embodiments of the present invention are given by way of illustration and are not intended as limitations on the scope of this invention. The nuclear magnetic resonance spectrometer utilized in conducting the following experiments was constructed in the manner of the spectrometer schematically illustrated in FIGURE 2 of the drawings. The samples were analyzed while at a temperature of about 25° C. to obtain dispersion signals of the type illustrated in FIGURE 3.

*Example 1*

Two samples were prepared, sample 1–A consisting of 25 ccs. of water (containing, as is well known, 11.19 grams of hydrogen per 100 ccs. of water) and sample 1–B, consisting of 25 ccs. of substantially pure glycerin containing about 8.76 grams of hydrogen per 100 ccs. of glycerin sample. Each of the samples was tested in a nuclear magnetic resonance spectrometer in order to provide an absorption and a dispersion signal wherein the hydrogen nuclei were precessed out of phase with the applied radio-frequency field and also to provide a dispersion signal obtained in accordance with the present invention (i.e., wherein the hydrogen nuclei were precessed in phase with the applied radio-frequency field to provide a substantially wholly positive, substantially bilaterally symmetrical dispersion signal as in FIGURE 3 having non-repetitive strength values at the center of the resonance band). The operating conditions employed are set forth in Table IA and the results obtained are set forth in Table IB. Detection was accomplished by means of a cathode ray oscilloscope for runs 1 and 2 and the intensities of the signals at the first maximum thereof as given in Table IB are expressed in arbitrary oscilloscope units. Detection was accomplished by means of a strip chart recorder for run 3 and the intensities of the signals at the first maxima thereof are expressed in arbitrary strip chart units. The scan rate for run 3 was 1 gauss in 20 seconds.

TABLE IA

| Run Number | 1 (Absorption) | 2 (Dispersion) | 3 (Dispersion) |
|---|---|---|---|
| Strength of Primary Magnetic Field, gauss | 2,865 | 2,865 | 940 |
| Frequency of Audio-Frequency Magnetic Field, cycles/sec | 10 | 10 | 60 |
| Amplitude of Audio-Frequency Magnetic Field, gauss | 1.0 | 1.0 | 0.03 |
| Frequency of Radio-Frequency Magnetic Field, megacycles per second | 12.2 | 12.2 | 4.0 |
| Intensity of Radio-Frequency Magnetic Field, gauss | 0.03 | 0.03 | 0.3 |
| Sample Temperature, °C | 25 | 25 | 25 |
| Inside Diameter of Sample Holder, mm | 13 | 13 | 13 |
| Estimated Effective Volume of Sample, cc | 3 | 3 | 3 |

TABLE IB

| Run Number | 1 (Adsorption) | | 2 (Dispersion) | | 3 (Dispersion) | |
|---|---|---|---|---|---|---|
| Sample Number | 1A (Water) | 1B (Glycerin) | 1A (Water) | 1B (Glycerin) | 1A (Water) | 1B (Glycerin) |
| Oscilloscope Units | 11 | 21 | 13 | 20 | | |
| Chart Units | | | | | 84 | 79 |
| Weight Percent Hydrogen | | 17.0 | | 13.7 | | 8.35 |

If the detected intensities for hydrogen with respect to sample 1–A (water) be considered as reference samples to supply the quantity "K" in the formula $h=KVC_2$ (discussed above), the calculations will show sample 1–B to contain, respectively, 17.0, 13.7 and 8.35 grams of hydrogen per 100 ccs. of glycerin for columns 1 to 3 of Table I. From this it is seen that a direct quantitative measurement of the hydrogen contained in the glycerin sample was obtained only in column 3 wherein the measurement was made in accordance with the present invention.

*Example 2*

Another series of experiments were conducted to detect, at the first maxima thereof, a plurality of dispersion signals for hydrogen, such signals having the shape shown in FIGURE 3. The nuclear magnetic resonance spectrometer was operated so as to provide a primary magnetic field having an average strength of about 2,865 gausses, such field being modulated in the order of about 0.1 gauss per cycle by means of a 60 cycle sinusoidal alternating current. Forward scanning of the resonance band for the nuclear species $H^1$ was accomplished by varying the strength of the primary magnetic field by about 0.5 gauss over a 20 second interval. An alternating radio-frequency magnetic field having a strength of about 0.1 gauss and a frequency of about 12.2 megacycles per second was applied at right angles to the primary magnetic field. The standard of reference was a solution of 1 gram of pure toluene in 25 ccs. of carbon tetrachloride. The samples that were tested each comprised a solution of one gram of the material to be tested in 25 ccs. of carbon tetrachloride. Materials that were analyzed and the results that were obtained are set forth in Table II:

TABLE II

| Sample | 1 Theoretical Hydrogen Content | 2 Analyzed Hydrogen Content Wt. Percent |
|---|---|---|
| Toluene | 8.75 | 8.70 |
| Ethyl Benzene | 9.50 | 9.1 |
| Methyl Alcohol | 12.58 | 12.4 |
| Benzene | 7.74 | 7.9 |
| Methyl Cyclo Hexane | 14.37 | 14.3 |
| n-Heptane | 16.10 | 15.9 |
| iso-Octane | 15.88 | 15.6 |

*Example 3*

In order to indicate the wide variety of materials that may be analyzed in accordance with the present invention, the following additional tests were run using a solution of one gram of n-heptane in 25 ccs. of carbon tetrachloride as the standard of reference. The samples to be tested each comprised one gram of material dissolved in 25 ccs. of carbon tetrachloride. The operating conditions employed were those set forth in Example 2. The materials tested and the results obtained are set forth in Table III.

TABLE III

| Sample | 1 Molecular Weight | 2 Theoretical Hydrogen Content, Wt. Percent | 3 Analyzed Hydrogen, Percent of Actual |
|---|---|---|---|
| Benzene | 78 | 7.74 | 99.1 |
| Napththalene | 128 | 6.29 | 99.2 |
| Trilaurin | 391 | 9.81 | 99.3 |
| Trimyristin | 723 | 11.99 | 99.6 |
| Tristearin | 891 | 12.44 | 100.0 |
| Butyl rubber | 40,000 | 14.2 | 100.0, 100.4 |
| Do | 70,000 | 14.2 | 99.9, 100.7 |

*Example 4*

Sodium ($Na^{23}$) was the nuclear species that was directly quantitatively determined in another series of tests wherein the nuclear magnetic resonance spectrometer was operated in the manner set forth in Example 2. Aqueous solutions of a plurality of sodium compounds were employed in making the tests and the first of the solutions (a sodium phosphate solution) was used as a standard of reference. The compounds that were utilized and the results that were obtained are set forth in Table IV.

TABLE IV

| Compound | Formula | Grams of Compound ($C_1$) | First Maximum of Dispersion Signal (h), mm. | Volume of Solvent, ml. | Actual Sodium Content, Percent | Analyzed Sodium Content, Percent |
|---|---|---|---|---|---|---|
| Sodium Phosphate | $NaH_2PO_4.H_2O$ | 5.32 | 81.1 | 25 | 16.66 | (1) |
| Sodium Chloride | NaCl | 2.04 | 71 | 25 | 39.3 | 38.0 |
| Sodium Carbonate | $Na_2CO_3$ | 2.18 | 88 | 25 | 43.4 | 44.2 |
| Sodium Citrate | $Na_3C_6H_5O_7.5H_2O$ | 4.63 | 82 | 25 | 19.8 | 19.3 |

1 Standard of reference; $KV = \frac{h}{C_1C_2} = \frac{81.1}{5.32 \times 16.66} = 0.915$.

Example 5

In another series of tests, aluminum ($Al^{27}$) was quantitatively determined by the process of the present invention. Aqueous solutions of aluminum nitrate and aluminum sulfate were employed and the aqueous aluminum nitrate solution was used as the standard of reference. The nuclear magnetic resonance spectrometer was operated in the manner set forth in Example 2. The results are set forth in Table V.

TABLE V

| Compound | Formula | Grams of Compound | Volume of Solvent, ml. | First Maximum of Dispersion Signal, mm. | Actual Aluminum Content, Percent | Analyzed Aluminum Content, Percent |
|---|---|---|---|---|---|---|
| Aluminum Nitrate | $Al(NO_3)_3.9H_2O$ | 6.15 | 25 | 55.69 | 7.19 | (1) |
| Aluminum Sulfate | $Al_2(SO_4)_3.nH_2O$ | 2.95 | 25 | 63.70 | 15.8 | 17.1 |

1 Standard of reference; $KV = \frac{55.69}{6.15 \times 7.19} = 1.26$

CONTROL OF CHEMICAL AND REFINERY PROCESSES BY NUCLEAR MAGNETIC RESONANCE MEANS

In accordance with the modified form of the present invention a refining or chemical process is controlled by nuclear magnetic resonance means. In many chemical and refining processes one or more liquid streams will be discharged from a treating zone. It will frequently happen that the content of a nuclear species in one or more of the discharge streams will be indicative of the effectiveness of treatment accomplished in the treating zone and that the effectiveness of treatment may be regulated in response to the content of the nuclear species in such a discharge stream.

When a chemical or refining process is to be controlled in accordance with the present invention, the sample holder of a nuclear magnetic resonance spectrometer may be fluidly connected with one of the discharge streams in any suitable manner. The detecting means of the nuclear magnetic resonance spectrometer may be connected with a responsive control member in the same or a different stream in any suitable manner for changing a regulating process variable such as the rate of quantity of charge or discharge, temperature, pressure, etc. in response to the content of a nuclear species content in a monitored discharge stream, as determined by the nuclear magnetic resonance spectrometer.

Figure 8:
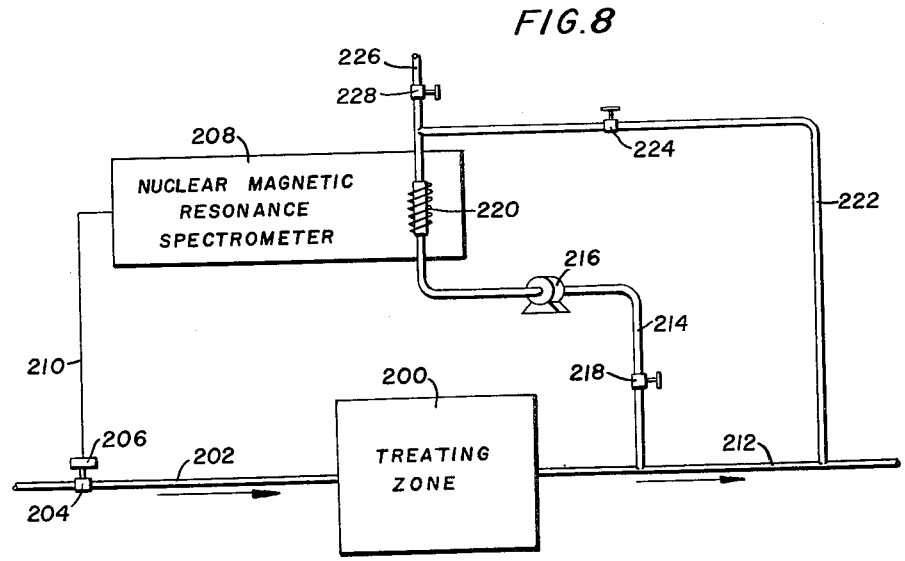
FIGURE 8 is a schematic illustration of a further embodiment of the present invention wherein a process is regulated by nuclear magnetic resonance means.

Such a process control operation is schematically shown in FIGURE 8 wherein a liquid is charged to a treating zone 200 by a line 202 controlled by an electrically operated valve 204 the valve 204 being regulated by a control member 206 operable in response to a signal derived from a nuclear magnetic resonance spectrometer 208 and transmitted by electrical connection or lead 210. A discharge line 212 leads from the treating zone 200 and a branch line 214 containing a pump 216 and controlled by a valve 218 leads from the line 212 to the sample holder 220 of the nuclear magnetic resonance spectrometer 208. A line 222 controlled by a valve 224 returns to the line 212 from the sample holder 220 and a branch line 226 controlled by a valve 228 discharges from the system.

In operation, the valves 218 and 222 are periodically opened by any suitable means (not shown) in order to provide for flow of a sample of the material in the discharge line 212 through the sample holder 220 and back to the line 212. In the alternative, the valve 224 may be closed and the valve 228 opened so that a sample of liquid material will flow through line 214 to the sample holder 220 and from thence through the line 226 where it will be discharged from the system. After a suitable interval the valves 218 and 224 or the valves 218 and 226, as the case may be, are closed so that liquid material in the sample holder 220 may be brought to a condition of steady molecular motion. The resonance band for a nuclear species in the liquid material in the sample holder 220 is then scanned by the nuclear magnetic resonance spectrometer 208 in the manner described above to provide a substantially wholly positive, substantially bilaterally symmetrical dispersion signal having a non-repetitive strength value at the center of the resonance band. The first maximum of intensity of the dispersion signal is registered (i.e., detected) by the detecting means (not shown) of the nuclear magnetic resonance spectrometer 208 in any suitable manner such as, for example, in the manner described with respect to FIG. 3 to provide a signal which is a direct measure of the total quantity of the nuclear species in the sample. The dispersion signal is then used to actuate the control member 206 to increase or decrease the rate of flow of charge stock to the treating zone through the line 202 if the content of the nuclear species in the sample has increased or decreased from a given optimum value by a predetermined amount in order to thereby maintain the desired treating conditions in the zone 200. After a suitable interval of time the material in the discharge line 212 is again monitored in the indicated fashion and in this manner the treatment accomplished in the zone 200 is effectively controlled.

CONTROL OF A DISTILLATION PROCESS

Figure 9:
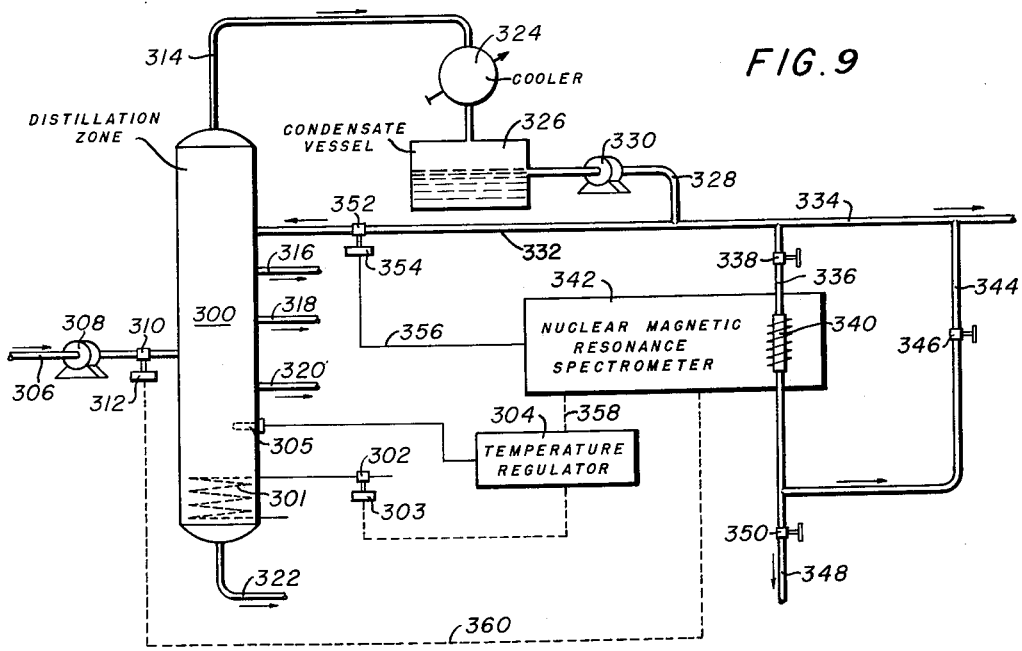
FIGURE 9 is a schematic diagram illustrative of a process for controlling a distillation process by nuclear magnetic resonance spectroscopic means.

A specific example of this control method, as applied to a distillation process, is schematically shown in FIGURE 9. In FIGURE 9 the numeral 300 designates a fractional distillation tower provided with bubble cap plates (not shown), or other similar packing and with means (not shown) conventional in the art for controlling the pressure therein. The distillation column is also provided with suitable heating means such as, for example, a steam coil 301 and is also provided in a suitable manner with means for regulating the flow of steam through the coil 301 whereby the temperature of the distillation column may be controlled. Such means may comprise, illustratively, an electrically operated diaphragm valve 302 in the steam line actuatable by a control member 303 electrically connected with a temperature regulator 304 which, in turn, is electrically connected with suitable temperature detecting means in the distillation column 300, such as a thermocouple 305. The temperature regular 304, which may be of any suitable construction familiar to the art, is operable to regulate the setting of the diaphragm valve 302 through the control member 303 in response to an electrical signal from the thermocouple 305 to maintain the temperature in the distillation column 300 at a value which may be predetermined and for which the temperature regulator 304 may be set or at a value determined by an electrical signal transmitted to the temperature regulator 304 from an external source in a manner to be explained subsequently.

A hydrocarbon charge stock such as, for example, a petroleum crude oil is charged to the distillation column 300 through a line 306 containing a pump 308 and an adjustable electrically operated valve 310, the setting of which is regulated by a control member 312 whereby the feed rate of the charge stock may be controlled. The charge stock delivered to the distillation column 300 through the feed line 306 is fractionated therein to obtain a plurality of component fractions, each of which fractions boils in a different range. For example, the crude oil may be fractionated in the distillation column 300 into an overhead fraction discharged through an overhead line 314, a gasoline fraction discharged through a line 316, a kerosene fraction discharged through a line 318, a gas oil fraction discharged through a line 320 and a residual fraction discharged through a bottoms line 322. Vapors from the overhead line 314 pass through a suitable cooling means 324 where they are condensed. Condensate from the cooling means 324 is accumulated in a vessel 326 and the condensate is discharged therefrom by a line 328 containing a pump 330. A branch line 332 leads from the pump 330 back to the distillation tower 300 as reflux and another portion of the condensate leads from the pump 330 through a line 334 from which it is discharged.

As is well known to those skilled in the art, it is possible to provide for an overhead fraction having a desired boiling range by regulating the amount of condensed overhead returned to the distillation tower 300 as reflux, by regulating the feed rate to the distillation column 300, by regulating the distillation temperature maintained therein by the heating coil 301, etc. Thus, for example, it may be desirable to obtain an overhead fraction containing propanes and butanes but substantially free from pentanes. The propanes, butanes and pentanes contain specifically different amounts of hydrogen. Accordingly, by measuring the hydrogen content of the overhead condensate for a given charge stock it is possible to determine the degree of separation of the condensate. For example, if the condensate contains an appreciable quantity of propanes and butanes but is substantially free from pentanes, the condensate will have a hydrogen content reflective of this fact and the hydrogen content will be decreased if pentanes are then added to the condensate.

Accordingly, if it is desired to obtain an overhead fraction substantially free from pentanes, the overhead condensate flowing through the line 334 may be periodically monitored in the above-described manner to determine the hydrogen content thereof by nuclear magnetic resonance means, which means may then be used to control the rate of reflux or any of several process variables in response to the total hydrogen content of the condensate flowing through the line 334.

Thus, there may be provided a branch line 336 controlled by a valve 338 which leads to the sample holder 340 of a nuclear magnetic resonance spectrometer 342. There is also provided a return line 344 controlled by a valve 346 and a discharge line 348 controlled by a valve 350. If the valves 338 and 346 are simultaneously opened a portion of the condensate flowing through the line 334 will be caused to flow through the nuclear magnetic resonance spectrometer sample holder 340 and then return to the line 334. If the valve 346 is closed and the valve 350 is opened condensate from the line 334 will flow through the sample holder 340 by way of the line 336 and will then be discharged from the system by way of line 348. A variable, electrically operated valve 352 may be provided in the reflux return line 332, the valve 352 being actuated by a control member 354 which, in turn, is regulated by a lead 356 leading from the detecting means of the nuclear magnetic resonance spectrometer 342.

In operation, the control member 354 is set to provide for a given rate of reflux through the line 332, the rate of reflux to be increased or decreased in response to a signal flowing through the lead 356, as may be required, in order to provide for a substantially constant hydrogen content in the condensate line 334.

In order to monitor the contents of the condensate line 334 the valves 338 and 346 or the valves 338 and 350 may be periodically opened by any suitable means (not shown) in order to establish periodic flow of a sample from the condensate line 334 through the sample holder 340; the sample returning to the line 334 if the valve 346 is open, or being discharged from the system if the valve 350 is open. After a sufficient interval of time has passed in order to completely flush the sample holder 340, flow therethrough is interrupted and the condensate in the sample holder 340 is preferably brought to a condition of steady molecular motion. The sample is then scanned by the nuclear magnetic resonance spectrometer 342 to determine the total hydrogen content thereof by detecting the first maximum of intensity of a nuclear magnetic resonance dispersion signal obtained in the manner described above to obtain a signal which is then transmitted through the lead 356 to the control means 354 for the valve 352. If the transmitted signal is indicative of a desired hydrogen content in condensate, there is no activation of the control means 354 and the setting of the valve 352 is not affected. However, if the transmitted signal is indicative of an undesirably high or low hydrogen content, the control means 354 will be activated to change the setting of the valve 352 to provide for a greater or lesser rate of reflux, as the case may be, whereby an overhead fraction having the desired hydrogen content will be taken overhead through the line 314. The scanning operation is periodically performed at suitable intervals in order to monitor the hydrogen content of the condensate flowing through the line 334 to thereby maintain positive continuous control of the rate of reflux of condensate to the distillation tower 300.

As an alternative method of control, the detecting means of the nuclear magnetic resonance spectrometer 342 may be provided with an electrical connection 358 (shown by a dotted line) leading to the temperature regulator 304 for controlling the temperature maintained in the distillation column 300. With this arrangement, a signal transmitted through the electrical connection 358 which is indicative of an excessive hydrogen content in the condensate flowing through the line 334 may be used to actuate the temperature regulator 304 to increase the distillation temperature by transmission of a signal to the control member 303 to change the setting of the diaphragm valve 302 to increase the rate of flow of steam through the coil 301. As a result, the temperature in the distillation column will be increased to thereby permit a greater portion of lower boiling components such as butanes to be taken overhead through the line 314. Conversely, if the signal transmitted from the nuclear magnetic resonance spectrometer 342 through the connection 358 is indicative of too low a hydrogen content in the condensate flowing through the line 334 (which indicates that excessive amounts of lower boiling components such as pentanes, etc. are going overhead through the line 314), such transmitted signal may be utilized to actuate the temperature regulator 304 and hence the control member 303 to change the setting of the diaphragm valve 302 to decrease the flow of steam through the coil 301 whereby the temperature maintained in the distillation column 300 will be decreased.

The operation of the distillation column 300 may also be controlled through regulation of the rate of delivery thereto. For example, the detecting means of the nuclear magnetic resonance spectrometer 342 may be electrically connected through a lead 360 (shown by a dotted line) with the control member 312 for the adjustable, electrically operated valve 310 in the feed line 306. If unwanted higher boiling components are being taken overhead from the distillation column 300 through the overheads line 314, nuclear magnetic resonance spectroscopic analysis of the condensate in the line 334 will detect a lowering of hydrogen content in the condensate and, as a result, the control member 312 will be actuated in response to a signal transmitted thereto through the electrical connection 360 to adjust the setting of the valve 310 to provide an increased rate of flow through the charge line 306 whereby the unwanted heavier components will be excluded from the overheads fraction discharged from the distillation column through the overheads line 314. On the other hand, if the signal transmitted to the control member 312 through the electrical connection 360 is indicative of an excessive hydrogen content in the condensate flowing through the line 334 (showing that desired higher boiling components are not present therein), the control member 312 will be actuated to change the setting of the valve 310 to provide for a decreased rate of charge through the charge line 306 whereby such higher boiling components will be taken overhead through the line 314.

It is to be understood that the foregoing examples of specific embodiments of the present invention have been given by way of illustration and are not intended as limitations on the scope of this invention since the present invention is susceptible of many modifications, as will be apparent to those skilled in the art.

What is claimed is:

In a distillation method conducted in a distillation zone controllable by a distillation variable wherein there is obtained, as a distillate fraction, a freely flowable single phase liquid containing nuclei of a nonparamagnetic nuclear species, the improvement which comprises polarizing a sample of said distillate in a nuclear magnetic resonance spectrometer in a primary magnetic field of polarization modulated with an audio-frequency magnetic field crossed at right angles by a radio-frequency magnetic field of predetermined frequency, scanning the resonance band of said nuclei of said nuclear species, the period of said audio-frequency magnetic field being less than the spin-lattice relaxation time of said nuclear species and the period of time of scan being greater than the spin-lattice relaxation time of said nuclear species, and inductively detecting the maximum intensity of the dispersion component to obtain a signal, whereby said signal will constitute a direct measure of the quantity of said nuclear species in said sample and regulating said distillation process in response to said signal.

References Cited in the file of this patent

UNITED STATES PATENTS

| | | |
|---|---|---|
| Re. 23,950 | Block | Feb. 22, 1955 |
| 2,459,404 | Anderson | Jan. 18, 1949 |
| 2,721,970 | Levinthal | Oct. 25, 1955 |

OTHER REFERENCES

Nuclear Resonance Spectrometer by Leonard Malling, published in Electronics, April 1953, pp. 184–187.

Techniques for Nuclear Magnetic Resonance Measurements on Granular Hygroscopic Materials by Shaw et al., Journal of Applied Physics, vol. 26, No. 3, March 1955, pp. 313–317.

Fundamentals of Nuclear Magnetic Resonance Absorption by Pake, American Journal of Physics, vol. 18, No. 7, 1950, pages 438–452, and vol. 18, No. 8, November 1950, pp. 473–486.

Shaw et al.: Journal of Chemical Physics, vol. 18, pp. 1113, 1114, August 1960.

Andrew: Nuclear Magnetic Resonance, Cambridge Press, 1955, pp. 56–62 relied on, also pages 130–132.

Bloembergen et al.: Article entitled "Relaxation Effects in Nuclear Magnetic Resonance Absorption," published in Physical Review, vol. 73, No. 7, Apr. 1, 1948, pp. 679–712.

Suryan: Article entitled "Nuclear Resonance in Flowing Liquids," published in Proceedings Indian Academy of Sciencies, vol. 33, pages 107–111.

Gutowsky et al.: The Review of Scientific Instruments, vol. 24, No. 8, August 1953, pp. 644–651.

Pound et al.: The Review of Scientific Instruments, vol. 21, No. 3, March 1950, pp. 219–275.

Weaver: Physical Review, vol. 89, No. 5, Mar. 1, 1953, pp. 925 to 930.

Anderson: Physical Review, vol. 76, No. 10, No. 15, 1949, pp. 1460 to 1470.